Jan. 12, 1937.  E. PICK  2,067,302
WATER TREATING APPARATUS
Filed Oct. 15, 1934
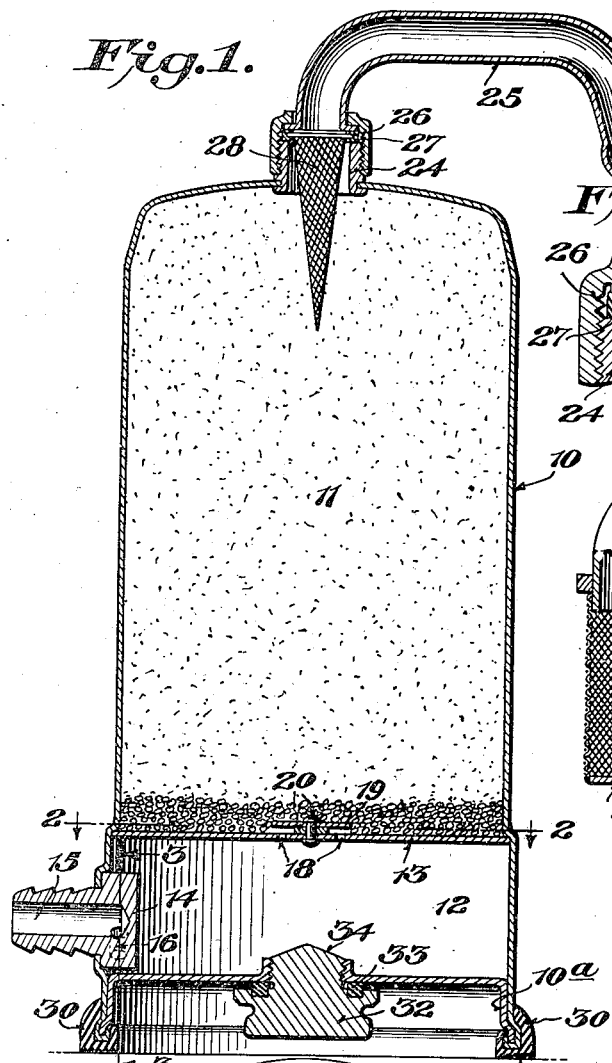
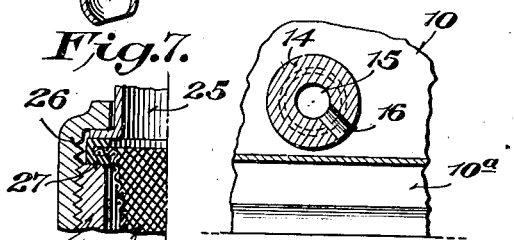
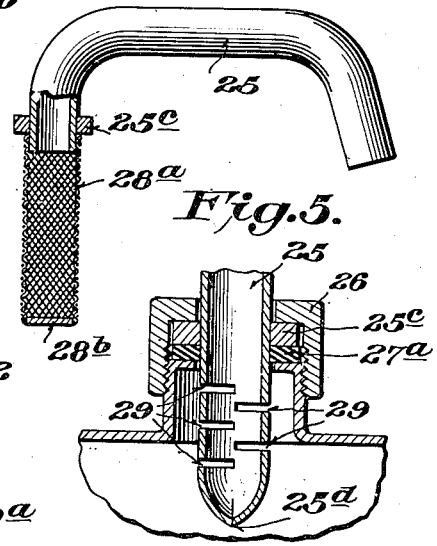
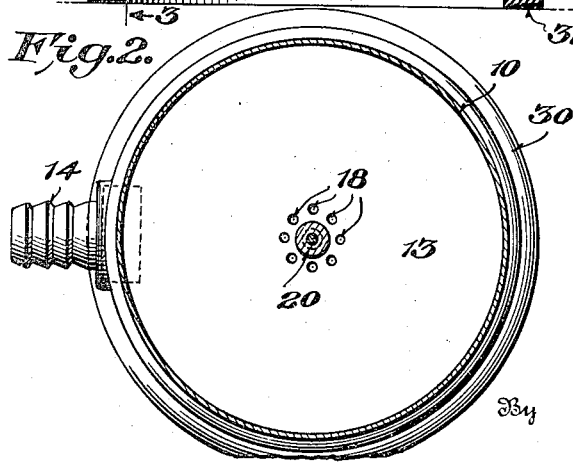
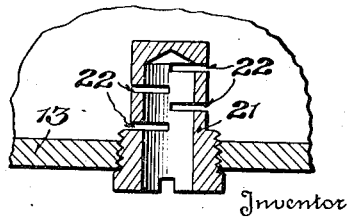
Inventor
Eric Pick,
By K. P. McElroy
Attorney Patented Jan. 12, 1937

2,067,302

UNITED STATES PATENT OFFICE 2,067,302

WATER TREATING APPARATUS

Eric Pick, New York, N. Y., assignor to The Permutit Company (1934), Wilmington, Del., a corporation of Delaware Application October 15, 1934, Serial No. 748,403

5 Claims. (Cl. 34—24)

This invention relates to water treating apparatus; and it comprises a small portable regenerative base exchange softener for connecting to a water faucet or the like wherein the water to be softened is caused to flow in succession through two chambers formed in a unitary container, the first or bottom chamber being a closed chamber provided advantageously with a side inlet nipple having a discharge passage directed downwardly at an acute angle from the horizontal and with a plugged bottom opening for introduction of salt for regenerating, the second or upper chamber being a softening chamber filled with a body or bed of granular base exchange zeolite locked in the chamber and having communication with the inlet chamber through a water distributing element in a common wall between the two chambers, and softened water is discharged from the top of the softening chamber through an outlet nipple and a locked discharge spout, the outlet being provided with removable foraminous means for holding the zeolite in the softening chamber; all as more fully hereinafter set forth and as claimed.

Base exchange water softening is a well developed art; large scale apparatus with either manual or automatic control having been brought to a high degree of effectiveness and convenience. In small scale portable apparatus, however, used for softening water drawn from a single faucet, much has remained to be accomplished in making the softening operation and the base exchange regeneration both efficient and convenient.

A prior patent No. 1,912,943 to Lamela, Pick & Robertson, upon the invention of which the present invention is an improvement, discloses a portable water softener operating by upward flow of water through a locked bed of granular zeolite with means for direct attachment of the softener to a water faucet and with regeneration by pouring salt brine into the locked zeolite bed through an opening in the top of the softener, the spent brine being rinsed out by upward flow of water through the bed.

I have now simplified and rearranged both the structure described in said patent for maintaining the locked bed of granular zeolite and the mode of operation including the provisions for regenerating the bed. I thus provide a portable softener which is relatively low in cost, convenient in operation and particularly effective in regeneration. Often, by reason of small size and small capacity, particularly when softening relatively hard water, frequent regeneration of portable softeners is required. One of the objects attained in the present invention is the provision of convenient means for efficient regeneration.

In the accompanying drawing I have shown more or less diagrammatically a portable water softener within my invention, the softener as shown being adapted for connection by a flexible hose to a water faucet. In this showing, Fig. 1 is a view in vertical section of the assembled portable softener;

Fig. 2 is a horizontal section along the line 2—2 of Fig. 1 looking in the direction of the arrows;

Fig. 3 is a detail view in transverse section along the line 3—3 of Fig. 1;

Fig. 4 is a view showing in section an alternative modification of the strainer outlet;

Fig. 5 is a view in section of another alternative modification of the strainer outlet;

Fig. 6 is a view in section of a modified form of inlet distributor; and

Fig. 7 is a detail sectional view of the outlet arrangement shown in Fig. 1.

Referring to the drawing, a metal container 10, which may advantageously be formed of drawn brass plate and plated with chromium externally, contains two substantially cylindrical contiguous chambers 11 and 12, chamber 11 being superposed upon chamber 12 and separated therefrom by a discoid partition 13, a discoid bottom piece 10a of the container 10 forming the bottom of chamber 12. As shown, the cylindrical container wall is slightly widened or offset to form chamber 12, and the partition 13 is soldered to the container wall at the offset. Chamber 12 is made of suitable size to hold a complete charge of salt for regenerating the zeolite as hereafter described, and also serves as an inlet distributing chamber for hard water. It is provided with an inlet connecting member 14 shown as a nipple adapted for attachment of a flexible hose connection running to a water faucet. Inlet nipple 14 is set in the side wall of chamber 12 and is formed with a closed inner end, a horizontal passage 15 and a communicating discharge passage 16 running at right angles to passage 15 and directed downwardly at an acute angle, about 45 degrees, from the horizontal. This gives a swirling and circulatory motion to the water entering chamber 12. The partition 13 is provided with water distributing means comprising, as shown in Figs. 1 and 2, a circle of apertures 18 of small area and a baffle plate 19 riveted to the partition with an interposed spacing washer 20; an alternative form of water distributing member being shown in Fig. 6, in somewhat enlarged detail, as a threaded nipple 21 screwed into partition 13 and thus removable. As shown, the nipple 21 is closed at the inner end and is provided with a plurality of transverse slits 22 in staggered positions. These slit perforations serve to distribute inlet water flowing from chamber 12.

Chamber 11 serves as the treating chamber in which water admitted from chamber 12 through the distributing element in partition 13 is softened. To this end chamber 11 is filled with a body or bed of granular water softening zeolite, as shown, advantageously with a layer of coarse gravel or coarse zeolite granules at the bottom of the chamber; the coarse layer being of sufficient thickness to cover baffle plate 19 when this is used. The zeolite body advantageously fills chamber 11 and forms a locked bed without free space. The locked bed has the effect of equalizing the flow of water through the bed, making the flow uniform across the area of the bed with minimized channeling.

The softening chamber 11 is provided at or near its top with an outlet nipple 24 which may be upset and soldered into an opening formed in the top of the container; and to this nipple a discharge spout 25 is conveniently connected by means of a locking nut 26 with a rubber gasket 27, the spout 25 being upset at the end to provide a flange engaging with the gasket and nipple to make a water tight connection. The bore in the nipple is wide enough to allow charging of the zeolite into chamber 11. In the water outlet at the top of chamber 11 a strainer 28 is inserted. This usually takes the form of a conical screen flanged at the base, gasket 27 being formed with an internal recess fitting over the flange of the screen and serving to hold the screen while making the outlet connection water tight (see Fig. 7). As shown, the screen member 28 extends into the zeolite bed, the screen being of a mesh size small enough to prevent the zeolite granules from being washed out through the outlet connection and also of sufficient total area to take the flow of water substantially without back pressure. To this end, it is advantageous to make the size of the inlet passages 15 and 16 in inlet nipple 14 of a smaller cross-sectional area than that of outlet connection 25. The foraminous member 28 is advantageously made of a non-corridible metal such as phosphor bronze or Monel metal.

In an alternative strainer arrangement shown in Fig. 4 the screen 28a is cylindrical in shape and is plugged at the lower end with a disk 28b which may be formed of brass. The screen may be attached as by soldering to the end of outlet spout 25, this fitting being provided with an integral flange or collar 25c to be locked by lock nut 26 with gasket 27a against the outer end of nipple 24.

The screen 28a shown in Fig. 4 may be replaced by another form of strainer as shown in Fig. 5. In this form the strainer is integral with outlet spout 25, fitting 25 extending into the zeolite bed, having its end pinched together as at 25d and being provided with transverse staggered slits 29, sufficiently small in size to prevent egress of the zeolite granules.

For convenience and neat appearance it is advantageous to have the container 10 formed with a bottom edge rolled over the bottom piece 10a, the joint being advantageously soldered, and projecting from the bottom of the container as shown in Fig. 1, with a rubber piece 30 fitted over the projecting edge and having corrugations in the flat base of the rubber piece as shown at 31.

In the bottom of the container an opening is formed near the center and this is closed by a removable closure advantageously taking the form of a threaded plug 32 screwed into the opening, a rubber gasket 33 being provided to make the closure water tight. This plugged opening serves for introduction of salt for regeneration of the zeolite bed as hereafter described, the end 34 of the plug having a conical shape to prevent lodging of solid salt granules. The opening with the easily removable closure 32 also serves to give access to the apertures 18 in partition 13 to clear out these apertures in the event of plugging by matter carried in the water. When the distributing member in partition 13 takes the form of a slitted nipple as shown in Fig. 6, it is advantageous to have the size of the bottom opening large enough to permit removal of distributing nipple 21 for cleaning.

In operation, the portable softener is connected through inlet nipple 14 and a flexible hose with a source of hard water such as a water faucet in household, kitchen, bathroom, laundry or the like. Incoming water passes through discharge passage 16 and through inlet distributing chamber 12 with a swirling motion, thence through the distributor apertures 18 or nipple 21 into the softening chamber 11 and through the zeolite bed. Here contact of the flowing water with the zeolite granules removes the hardness giving elements and softened water passes through the strainer at the top of chamber 11 and runs out through the discharge spout 25, which, by reason of its structural arrangement, as described, can be set at any desired angle, the connection of member 25 with outlet nipple 24 being of the swivel type. After a time, depending upon the hardness of the water and the quantity of water softened, the zeolite bed becomes exhausted and is regenerated by common salt. For regeneration it is particularly convenient to turn the softener upside-down, to remove plug 32 and to fill chamber 12 with solid salt introduced through the bottom opening; then replacing the plug and allowing sufficient water to flow from the faucet into and through chamber 12 to dissolve the salt and carry it in solution into the zeolite bed. For this, the angular position of passage 16 gives the incoming water a swirling motion in chamber 12 and thus facilitates solution of the introduced salt. The salt brine thus carried into the bed is allowed to stand for a time to complete the regenerative action and the spent brine is then rinsed out through member 25 by a flow of water from the faucet introduced through nipple 14. Regeneration, as described, is simple, convenient and efficient.

If desired, the salt for regeneration can be made into a brine and poured as such through the bottom opening into the zeolite bed after removing plug 32.

Should the zeolite in the course of time and continued use become contaminated by impurities carried in the water, it is a simple matter to remove the nut 26 with discharge spout and strainer, and to rinse the zeolite out of the container through outlet nipple 24, to wash the zeolite and return it; removal and replacement of the strainer and fitting 25 being easy and convenient.

The softener, as described, is convenient and effective for treating water taken from an ordinary domestic water faucet by means of a flexible hose connection and a faucet adapter. The softener can be so set with relation to the faucet that soft water is drawn from member 25 as conveniently as from the faucet itself by turning on the faucet, the swiveled outlet being readily turned to a desired angle.

The integral arrangement of the container with two contiguous cylindrical chambers separated by a permanent discoid partition fitted with a water distributing element is useful generally in water treating. For example, the chamber II may be filled with granular activated carbon instead of zeolite, to remove objectionable taste, odor, or color from water, thereby making it more palatable for drinking and better suited for cooking purposes.

What I claim is:—

1. In a portable regenerative base exchange water softener comprising a softening chamber and an underlying inlet distributing chamber provided with a side inlet connection for connecting the softener to a hard water supply and a closable opening for introducing regenerating material into the distributing chamber, a passage in said side inlet connection directed toward the bottom of the chamber at an acute angle from the horizontal.

2. In a portable regenerative base exchange water softener comprising a softening chamber and an underlying inlet distributing chamber provided with a side inlet connection for connecting the softener to a hard water supply and a closable opening for introducing regenerating material into the distributing chamber, a horizontal passage in said side inlet connection and a discharge passage communicating with the horizontal passage and directed toward the bottom of the chamber at an acute angle from the horizontal.

3. A portable water treating apparatus comprising a unitary substantially cylindrical container having formed therein two contiguous chambers, the upper chamber being a closed water treating chamber filled with granular water treating material, the lower chamber being a closed water distributing chamber having inlet means adapted for a flexible connection between the apparatus and a raw water supply, said two chambers being defined by a discoid partition permanently fixed to the container wall and forming the top of the lower chamber and the bottom of the upper chamber, a plurality of water distributing apertures near the center of the partition, a baffle plate in the upper chamber above said apertures, a central closable opening in the bottom of the lower chamber in line with said water distributing apertures and permitting access to said apertures, a removable closure for said opening, outlet means for treated water communicating with the top of the treating chamber and removable foraminous means held by the outlet means within said chamber for preventing loss of the treating material.

4. A portable water treating apparatus comprising a container for water treating material, an inlet connection near the bottom of the container for flexibly connecting the apparatus to a raw water supply, a threaded outlet nipple integral with the top of the container, a swiveled discharge spout extending laterally beyond the container walls and having a rotatable connection to the outlet nipple comprising a flange on said spout, a gasket interposed between the flange and the nipple, a threaded member engaging the nipple and adapted to press the flange against the nipple, and a strainer guarding the inlet to said spout and held by said flange and gasket.

5. In water treating apparatus a substantially cylindrical metal container divided into two contiguous cylindrical chambers separated by a discoid partition permanently fixed to the container wall, one of said chambers being a treating chamber for containing a body of granular water treating material and having outlet means near its top for water, the other chamber being an inlet distributing chamber provided with an inlet water connection and with a closable opening of substantial size having a removable water tight closure, and detachable foraminous water distributing means fitted in said discoid partition and capable of being removed through said closable opening.

ERIC PICK.